(12) United States Patent
Vijayendran et al.

(10) Patent No.: US 7,923,490 B2
(45) Date of Patent: Apr. 12, 2011

(54) STRUCTURAL COMPOSITES WITH ENHANCED MODULI OF ELASTICITY

(75) Inventors: Bhima R. Vijayendran, Dublin, OH (US); Wesley R. Childers, Columbus, OH (US); Thomas J. Chelwick, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/569,534

(22) PCT Filed: Aug. 27, 2004

(86) PCT No.: PCT/US2004/028052
§ 371 (c)(1),
(2), (4) Date: Feb. 12, 2007

(87) PCT Pub. No.: WO2005/021656
PCT Pub. Date: Mar. 10, 2005

(65) Prior Publication Data
US 2007/0167540 A1 Jul. 19, 2007

Related U.S. Application Data

(60) Provisional application No. 60/507,339, filed on Sep. 30, 2003, provisional application No. 60/498,963, filed on Aug. 29, 2003.

(51) Int. Cl.
C08K 11/00 (2006.01)
C08L 89/00 (2006.01)
C08L 97/02 (2006.01)
B29C 47/00 (2006.01)
(52) U.S. Cl. ............................................. 524/9; 524/13
(58) Field of Classification Search .................. 524/9, 13
See application file for complete search history.

(56) References Cited

U.S. PATENT DOCUMENTS

| | | | | |
|---|---|---|---|---|
| 4,017,438 A | * | 4/1977 | Jerabek et al. | 523/420 |
| 4,148,950 A | * | 4/1979 | Brindell et al. | 427/386 |
| 4,724,253 A | * | 2/1988 | Cavitt et al. | 525/504 |
| 4,877,837 A | * | 10/1989 | Reising et al. | 525/100 |
| 4,882,112 A | * | 11/1989 | Maki et al. | 264/109 |
| 4,950,710 A | * | 8/1990 | Roha | 524/786 |
| 5,002,713 A | * | 3/1991 | Palardy et al. | 264/109 |
| 5,480,602 A | | 1/1996 | Nagaich | |
| 5,725,940 A | * | 3/1998 | Sakai et al. | 428/318.6 |
| 5,741,875 A | * | 4/1998 | Meister et al. | 527/400 |
| 5,837,785 A | * | 11/1998 | Kinsho et al. | 525/527 |
| 5,981,631 A | | 11/1999 | Ronden et al. | |
| 6,031,012 A | * | 2/2000 | Nakanishi et al. | 521/111 |
| 6,210,792 B1 | * | 4/2001 | Seethamraju et al. | 428/326 |
| 6,265,037 B1 | * | 7/2001 | Godavarti et al. | 428/34 |
| 6,362,252 B1 | * | 3/2002 | Prutkin | 523/200 |
| 6,423,778 B1 | * | 7/2002 | McGee et al. | 525/165 |
| 6,476,160 B1 | * | 11/2002 | Okuhira et al. | 525/524 |
| 6,620,865 B2 | * | 9/2003 | Westland et al. | 524/13 |
| 6,624,217 B1 | * | 9/2003 | Tong | 524/9 |
| 6,649,673 B2 | | 11/2003 | Browning et al. | |
| 6,740,706 B2 | * | 5/2004 | Ohrbom et al. | 524/714 |
| 6,863,971 B2 | * | 3/2005 | Halahmi et al. | 428/311.71 |
| 6,903,149 B2 | * | 6/2005 | Yasuda et al. | 524/13 |
| 2002/0005602 A1 | * | 1/2002 | Jacobsen | 264/211 |
| 2002/0026015 A1 | * | 2/2002 | Ramesh | 525/437 |
| 2002/0171162 A1 | * | 11/2002 | Halahmi et al. | 264/37.27 |
| 2002/0192401 A1 | * | 12/2002 | Matsumoto et al. | 428/15 |
| 2003/0008947 A1 | | 1/2003 | Browning et al. | |
| 2003/0152785 A1 | * | 8/2003 | Sanders et al. | 428/447 |
| 2004/0126555 A1 | * | 7/2004 | Hartmann et al. | 428/296.7 |
| 2004/0132866 A1 | | 7/2004 | Browning et al. | |
| 2004/0132901 A1 | | 7/2004 | Browning et al. | |
| 2006/0145383 A9 | * | 7/2006 | Manning et al. | 264/122 |

FOREIGN PATENT DOCUMENTS

| | | |
|---|---|---|
| JP | 60-170643 | 9/1985 |
| JP | 63-230750 | 9/1988 |
| JP | 10-237314 | 9/1998 |

OTHER PUBLICATIONS

Kokta et al., "Use of Wood Fibers in Thermoplastic Composites," *Polymer Composites* 4: 229-232 (1983) XP-00972883.
Kokta et al., "Composites of Poly(Vinyl Chloride) and Wood Fibers, Part II: Effect of Chemical Treatment," *Polymer Composites* 11: 84-89 (1990) XP-00972881.
Maldas et al., "Composites of Polyvinyl Chloride—Wood Fibers: IV Effect of the Nature of Fibers," *J. Vinyl Tech.* 11: 90-99 (1989) XP-00972888.
Sain et al., "Toughened Thermoplastic Composite. I. Cross-Linkable Phenol Formaldehyde and Epoxy Resins-Coated Cellulosic-Filled Polypropylene Composites," J. App. Polymer Science 48(12): 2181-2196 (1993) X-003211561.
Holm, R.T., "Ketimines as Latent Epoxy Curing Agents," Journal of Paint Technology, vol. 39(509) (Jun. 1967) pp. 385-388.
Japanese Office Action dated Oct. 28, 2009 for Application No. JP 2006-524 915.
International Search Report dated Jan. 7, 2005 for Application No. PCT/US2004/028052.
International Preliminary Report on Patentability dated Feb. 28, 2006 for Application No. PCT/US2004/028052.

* cited by examiner

*Primary Examiner* — Mark Eashoo
*Assistant Examiner* — Liam J Heincer
(74) *Attorney, Agent, or Firm* — Frost Brown Todd, LLC

(57) ABSTRACT

The invention provides for structural composites made from biomaterials such as wood products, plant fibers and the like; and/or a non-biomaterial having free —OH groups; a thermoplastic resin such as a polyolefin; coupling agents such as a thermosetting resin or a second thermoplastic resin; a blocked catalyst, a crosslinker and other functional additives may be used.

20 Claims, 3 Drawing Sheets

STRUCTURAL COMPOSITES WITH ENHANCED MODULI OF ELASTICITY

This application claims the benefits of U.S. Provisional Application STRUCTURAL BIOCOMPOSITES, Ser. No. 60/507,339, filed Sep. 30, 2003; and U.S. Provisional Application STRUCTURAL BIOCOMPOSITES, Ser. No. 60/498, 963, filed Aug. 29, 2003, having the same inventors as the present application.

The provisional applications are incorporated by reference as if completely rewritten herein.

FIELD OF THE INVENTION

The invention provides a low cost structural composite alternative for use in typical structural lumber/wood applications in building construction, marine, transportation applications, and the like.

BACKGROUND OF THE INVENTION

There is a need for a cost effective substitute for dimensional lumber, treated wood and other products based on low cost biobased materials (such as wood flour, agrifibers) or other materials that can be processed by conventional extrusion equipment and have properties better than or similar to structural wood products.

Technology to-date has focused on developing thermoplastic biocomposites based on wood flour and thermoplastic resins such as polyolefins, polyvinyl chloride manufactured by extrusion process. These products have many useful features, but do not have the structural properties required to replace traditional wood products in many applications. There are also technologies to manufacture thermoset cellulose composites based on wood chips and agrifiber in combination with thermoset resins such as phenolics, urea-formaldehyde, and so on, by compression molding process. These thermoset properties have good structural properties, but they are not processable in standard extrusion equipment.

BRIEF DESCRIPTION OF THE INVENTION

Figure 1:
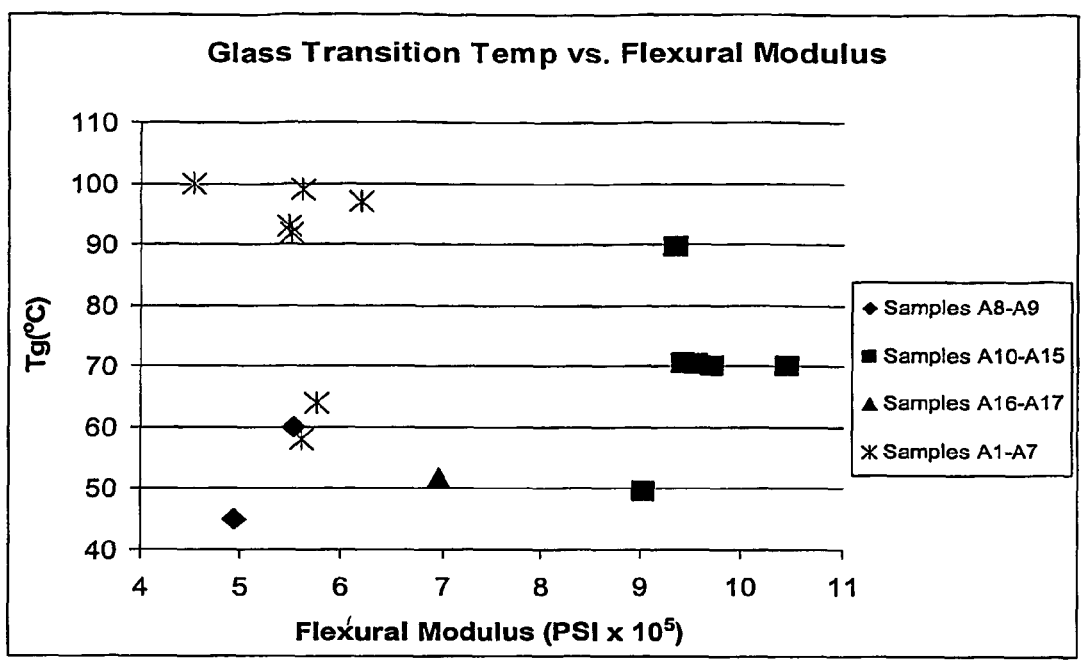
FIG. 1 is a graph showing the glass transition temperature as a function of flexural modulus for several materials. Glass transition temperature is on the vertical scale, $T_g$ in ° C. Flexural modulus is on the horizontal scale in pounds per square inch (PSI).

Broadly the present invention provides for a thermoset matrix that is processable like a thermoplastic. Typically the properties remain through at least two processing cycles.

In one aspect of the invention, a material such as a biomaterial that has a polar functionality (e.g. free —OH groups) is reacted with a non-polar olefin polymer, a reactive coupling agent, and a latent catalyst such as a blocked catalyst to produce a composite having a high flexural modulus with good dimensional stability under wet and dry conditions. In some embodiments a functional additive such as the blocked catalyst is added that acts as a pseudo crosslinking agent. On some embodiments, the functional additive when added as a blocked catalyst is unblocked under extrusion conditions in the presence of residual or added moisture available in the biomaterial and/or non-biomaterial. This leads to a higher flexural modulus.

In some embodiments the biomaterials and/or non-biomaterials need not be dried to the extent of current technology. For example wood flour need not be predried to less than 5% moisture. Structural composites with wood flour having a moisture content of up about 8% have been produced at high throughput with good surface smoothness and finish.

In a typical embodiment of the invention there is provided a structural composite including a biomaterial and/or a non-biomaterial having free —OH groups; a first thermoplastic resin mixed with the biomaterial and/or non-biomaterial; and a coupling agent that appears to bind the biomaterial and/or non-biomaterial with the first thermoplastic resin. Typically the coupling agent comprises a second thermoplastic resin, and or a thermoset resin. The thermoset resin may be bisphenol A. Some typical embodiments include a crosslinking agent, a blocked catalyst, and the like. The biomaterial is typically selected from the group consisting of plant fibers, granulated plant derivatives, and mixtures thereof. In other embodiments the biomaterial is selected from the group consisting of wood flour, wood flakes, soy flour, and mixtures thereof. Typically the fiber is selected from the group consisting of flax fibers, straw fibers, hemp fibers, jute fibers, cotton fibers, animal fibers such as wool, hair, feathers, and mixtures thereof. Glass fibers and other synthetic fibers may also be added.

In some embodiments the thermoplastic resin comprises a polyolefin. The polyolefin is typically selected from the group consisting of polypropylene, polyethylene, polybutylene, and polyvinylchloride, and mixtures thereof.

In yet other embodiments chopped fiber glass, may be mixed with the biomaterial, a first thermoplastic and a coupling agent. Long grain fibers may also be used to augment composite properties.

Typically the coupling agent is a latent cross linker of agrifiber/wood with blocked curing agents that are activated immediately before, during, or after the extrusion, roll milling, pressing, or other forming process. In embodiments where non-biomaterials with free —OH groups are used the coupling agent is a latent crosslinker of the material with blocked curing agents that are activated immediately before, during, or after the extrusion, roll milling, pressing, or other forming process. In some embodiments the coupling agent is an interfacial compatibilizing agent.

Another embodiment of the invention provides for method for making a structural composite by the steps of mixing a biomaterial and/or a non-biomaterial having polar functionality such as free —OH groups, a thermoplastic resin (e.g. polyolefin), and a coupling agent; and extruding the mixture. Typically a blocked catalyst is added to the mixture prior to extrusion, wherein the catalyst unblocks under extrusion conditions.

A further embodiment of the invention provides for method for making a structural composite by the steps of mixing a biomaterial and/or a non-biomaterial having polar functionality such as free —OH groups, a polyolefin, and a coupling agent; and roll milling the mixture. Typically a blocked catalyst is added to the mixture prior to roll milling, wherein the catalyst unblocks under roll milling conditions.

An additional embodiment of the invention includes a method for making a structural composite by the steps of mixing a biomaterial and/or a non-biomaterial having polar functionality (e.g. free —OH groups or other polar group), a thermoplastic resin (e.g. polyolefin), and a coupling agent; and compression molding the mixture. Typically a blocked catalyst is added to the mixture prior to compression molding, wherein the catalyst unblocks under compression molding conditions.

Typically the thermoset coupling agent provides for final thermoset properties from thermoplastic inputs and biomaterial (or nonbiomaterials with biomaterial properties), optional filler, and blocked catalyst.

Blocked ketimines are useful with the present invention. Typical ketimines and their methods for making are found in U.S. Pat. No. 6,649,673; US published applications 20040132901A1, and US 20040132866A1 which are incorporated by reference herein.

The invention provides for structural biocomposites that can be substitutes for manufactured products typified but not limited to dimensional lumber, treated wood products, waterfront infrastructure, decks, doors, windows, and the like.

DETAILED DESCRIPTION OF THE INVENTION AND BEST MODE

Structural biocomposites according to the invention typically include materials derived from biomaterials, as discussed in greater detail below, combined with one or more thermoplastic resins and one or more coupling agents. In some embodiments non-biomaterial fibers, typically selected from polymers, glass, minerals, and metals may be used alone or in combination as a mixture of fibers. Typically the fibers are chopped to obtain a desired aspect ratio. The structural biocomposites have one or more improved physical properties compared to the biomaterials or thermoplastic materials alone.

Definitions

Biomaterial—as used herein includes a fibrous material typically derived from natural sources. The natural sources include timber products and byproducts, and agricultural products and byproducts. Typical examples of timber products and byproducts include but are not limited to wood flour, wood flakes, and mixtures thereof. Typical examples of agricultural products and byproducts include but are not limited to flax fibers, straw fibers, hemp fibers, jute fibers, cotton fibers, and mixtures thereof. Timber products and agricultural products may also be mixed to obtain desired properties. The aspect ratio of the fibrous material typically encompasses about 1 to about 200. In some embodiments the aspect ratio is between about 1 to about 10 and in others between about 1 to about 5. In yet other embodiments the aspect ratio is typically about 2 to 25, in others 2 to 10 and in yet others 2 through 5. Fibrous material typified by hemp, flax, and the like, typically has an aspect ratio of about 25 to about 200. The particular selection of aspect ratio depending on the properties desired for the structural biocomposite. Typically a higher aspect ratio provides for better mechanical properties such as higher tensile strength, impact strength and modulus.

In addition to the biomaterials some non-biomaterials will also work with the invention. The key requirement is that the non-biomaterials have polar functionality such as free —OH groups that can react with the resins and coupling agents according to the invention so as to form composites in a manner similar to that when biomaterials are used. When the term biomaterial is used herein it typically includes the non-biomaterials that react similarly to the biomaterials of the invention. The term composite is meant to include composites where biomaterials are used, where non-biomaterials are used, and composites where both are used. Typical examples of non-biomaterials include glass fibers, synthetic fibers such as nylon, polyester and the like.

Particle sizes of the biomaterial used with the invention typically have a maximum size of about 400 to about 300 mesh. Larger particle sizes tend to reduce properties such as strength, elongation and toughness. In one embodiment the particle size ranges from about 40 to about 300 mesh. In yet others the particle size is from about 200 mesh to about 300 mesh. A particularly preferred particle size is between about 40 and 100 mesh.

Coupling agent—as used herein is a material that strengthens the interface between the biomaterial and a thermoplastic resin. While not wishing to be bound by theory, it is believed that the coupling agent serves as a compatibilizer between the thermoplastic and biomaterial leading to improved mechanical properties, e.g. modulus of elasticity (flexural modulus). In some embodiments the coupling agent may also be a crosslinker.

Granulated plant materials include any cominutated plant materials that fulfill the size ranges provided herein. The granulated material may be in the form of flakes, flour, powder, or other typical particulate.

Typically the coupling agent is a second thermoplastic resin or a thermoset resin. The thermoplastic resin and/or thermoset resin is typically selected from the group consisting of an epoxy and a crosslinking agent, functional epoxy silane, ketimine, a blocked epoxy with ketimine, phenolic, polyester, acrylic, and urethane, polyolefin, and mixtures thereof. When not used with a crosslinker an epoxy resin, such as Epon 1001F, is considered a thermoplastic.

In some embodiments of the invention blocked catalysts are used in conjunction with the resins and/or coupling agents.

The approach disclosed by the present invention relates to compositions and extrusion processing conditions for the manufacture of structural biocomposites. A few of the specific embodiments are: use of high aspect ratio fibers such as flax, hemp, chopped fiber glass to strengthen the composites, smaller particle size wood flour in the composite, use of cross linkers such as functional silanes, latent cross linking of agri-fiber/wood with blocked curing agents that could be activated after the extrusion process, cross linking of polyolefin with peroxide chemistry, use of interfacial compatibilizing agents to strengthen the bond between wood/biofiber and plastic and others. The processing variables considered in this invention relate to master batching the additives, screw design in the extruder to maximize mixing and orientation of fibers with minimum break down of the fiber, sequential feeding of coupling agent(s) to minimize premature curing in the reactor and associated apparatus.

Surprisingly it was found that when a thermoplastic and a biomaterial were reacted with a coupling agent that the mechanical properties of the resulting material were increased over that of the thermoplastic and biomaterial alone. A series of tests are outlined in Tables 1-3 below that confirms this finding. Table 1 lists data for four different trials using various types of processing equipment. The equipment includes a single screw extruder (Model No. 1.5 TMC 30D, 1.5 INCH, 30:1 L/D ratio, manufactured by HPM Corp., Mt. Gilead, Ohio, 43338, USA), a two roll mill (Model No. 5352-M20, 8"×8"×20" Lab, manufactured by Erie Mill & press Co., Erie, Pa. 16512, USA); twin screw extruder (Model No. ZE 40A X32D, 40 mm, manufactured by Berstorff, Florence, Ky., USA). The two roll mill was used for two separate sets of trials.

Typical thermoprocessing methods including injection molding, extrusion, and compression molding may be used. Surprisingly, a small amount of thermosetting material, as illustrated in the examples, could be added to the thermoprocessing equipment without any problems such as freezing of the screws.

EXAMPLES

The following examples are illustrative and are not meant to limit the invention in any way.
Testing: The tensile and flex properties were tested on an Instron 4505 using Series IX materials testing software.
The following conditions were used:
Tensile:
Load Cell: 225 lbf
Crosshead Speed: 0.10 inches/minute
Data sampling rate: 10 pts/second
Specimen gauge length: 1 inch
Flex: Three-point bend method
Load Cell: 225 lbf
Crosshead Speed: 0.10 inches/minute
Data sampling rate: 10 pts/second
Span: 2 inches
The materials were added, mixed and processed in the following manner:
Extrusion Runs:
   All components were weighted out in the appropriate amounts then placed into a container. The container was then sealed and mixed for 1 (one) hour on a roller mill. The material was then run through an extruder at the following conditions:
Melt Temperature: 360° F.
Die Temperature: 340° F.
Screw Speed: 80 RPM
Two-Roll Mill Runs:
   All the recipe components were individually weighed out. The entire amount of the polypropylene was banded on the mill. Next, approximately one-half of the total amount of the wood flour was added in small aliquots and each aliquot was completely blended in before further addition. The other components were then added along with wood flour in small amounts until all components were added. The batch was worked on the mill until it was homogeneous.
   After the batch was completely mixed it was then stripped from the rolls and pressed flat until cool. The following conditions were used:
Roll Speed: Front roll 12 rpm; 2:1 ratio, front roll to back roll
Roll Temperature: 300° F.
Roll Gap: 0.020 inches Comparative Example 1C Comparative example 1C provides a baseline for assessing the advantage of mixing various biomaterials and coupling agents with a thermoplastic resin using a single screw extruder. Example 1C uses only a 100% polypropylene resin BP 7200. BP 7200 is available from BP AMOCO Polymers, Naperville, Ill., 60563, USA. Tensile strength (psi), modulus of elasticity (psi), flexural strength (psi), and flexural modulus (psi) were measured.

TABLE 1

| Example No. | PP BP 7200 | Wood Flour | CACO3 | Soy Flour | PB 3200 | Hemp | Flax | Phenethyl-methoxysilane | Tensile Str. (PSI) | Tensile Modulus (PSI) | Flexural Str. (PSI) | Flexural Modulus (PSI) |
|---|---|---|---|---|---|---|---|---|---|---|---|---|
| Single Screw Extruder | | | | | | | | | | | | |
| 1C | 100% | | | | | | | | 4485 | 238323 | 6679 | 196400 |
| 1 | 77.00% | 100 Mesh 20% | | | 3.00% | | | | 4110 | 324162 | 7043 | 254141 |
| 2 | 77.00% | 200 Mesh 20% | | | 3.00% | | | | 4179 | 319124 | 7920 | 342935 |
| 3 | 67.00% | 100 Mesh 30% | | | 3.00% | | | | 2960 | 327363 | 5610 | 284913 |
| 4 | 67.00% | 200 Mesh 30% | | | 3.00% | | | | 3803 | 351866 | 6224 | 289227 |
| 5 | 67.00% | 200 Mesh 20% | 10.00% | | 3.00% | | | | 4340 | 313210 | 7448 | 290715 |
| 6 | 69.90% | 200 Mesh 30% | | | | | | 0.10% | 3162 | 307619 | 5947 | 249748 |
| 7 | 79.90% | 200 Mesh 20% | | | | | | 0.10% | 3018 | 315171 | 5831 | 257667 |
| 8 | 67.00% | 200 Mesh 25% | | 5.00% | 3.00% | | | | 3940 | 343462 | 7065 | 286612 |
| 9 | 62.00% | 200 Mesh 25% | | 10.00% | 3.00% | | | | 3218 | 366970 | 5978 | 277051 |
| 10 | 69.90% | 200 Mesh 20% | 5.00% | 5.00% | | | | 0.10% | | | | |
| 11 | 67.00% | 200 Mesh 20% | 5.00% | 5.00% | 3.00% | | | | 3263 | 333194 | 6078 | 291658 |
| Two Roll Mill | | | | | | | | | | | | |
| 12 | 77.00% | 200 Mesh 20% | | | 3.00% | | | | 3373 | 420647 | 9313 | 288060 |
| 13 | 37.00% | 200 Mesh 60% | | | 3.00% | | | | 4000 | 823468 | 9484 | 526329 |
| 14 | 49.90% | 200 Mesh 40% | 10.00% | | | | | 0.10% | 1954 | 778064 | 4866 | 433294 |
| Berstorff Extruder | | | | | | | | | | | | |
| 15 | 37% | 200 Mesh 60% | | | 3% | | | | 3172 | 598488 | 6261 | 471959 |
| 16 | 37% | 200 Mesh 50% | | | 3% | 10% | | | 3675 | 593822 | 6431 | 438434 |
| 17 | 47% | 200 Mesh 40% | | | 3% | 10% | | | 3864 | 532636 | 7121 | 431633 |
| 18 | 47% | 200 Mesh 40% | | | 3% | 5% | 5% | | 4184 | 516430 | 7457 | 403335 |
| Two Roll Mill | | | | | | | | | | | | |
| 2C | 100% | | | | | | | | 4485 | 238323 | 6679 | 196400 |
| 19 | 37.00% | 200 Mesh 50% | 10.00% | | 3.00% | | | | 3065 | 532571 | 7610 | 465136 |
| 20 | 34.00% | 200 Mesh 50% | 10.00% | | 6.00% | | | | 3773 | 559275 | 9330 | 465214 |
| 21 | 31.00% | 200 Mesh 50% | 10.00% | | 9.00% | | | | 4542 | 533120 | 9455 | 474044 |

100 Mesh Wood Flour was manufactured by American Wood Fibers and has an aspect ratio of 4:1 L/d
200 Mesh Wood Flour was manufactured by American Wood Fibers and has an aspect ratio of 3:1 L/d
Calcium Carbonate has was manufactured by ECC America and has an aspect ratio of 2:1 L/d Item # SSA 4461
Soy Flour was manufactured by Battelle and has an aspect ratio of 2:1 L/d
Phenethyle trimethylsiloxane was manufactured by Gelest Inc. Item # SIP 6722-6 Lot # 2B-9859

TABLE 2

Trials with Epon and Blocked Amine

| Two Roll Mill | PP BP 7200 | Wood Flour | Epon1001F | Amine Blkr. | Tensile Str. (PSI) | Tensile Modulus (PSI) | Flexural Str. (PSI) | Flexural Modulus (PSI) |
|---|---|---|---|---|---|---|---|---|
| 22 | 29.00% | 50.00% | 21.00% |  | 2292 | 599203 | 5921 | 903694 |
| 23 | 27.10% | 50.00% | 21.30% | 1.60% | 2937 | 676430 | 8122 | 955867 |
| 24 | 27.10% | 50.00% | 21.30% | 1.60% | 3009 | 709936 | 7662 | 971955 |
| 25 | 26.00% | 50.00% | 20.00% | 4.00% | 2973 | 656931 | 8039 | 935303 |

| Two Roll Mill | PP BP 7200 | Wood Flour | Epon1001F | Amine Blkr. | Flax | Flexural Strength (PSI) | Flexural Mod. (PSI) |
|---|---|---|---|---|---|---|---|
| 26 | 40.00% |  | 20.00% |  | 40.00% | 3133 | 694473 |
| 27 | 55.00% |  |  |  | 45.00% | 4495 | 660683 |
| 28 | 23.50% | 50.00% | 20.00% | 1.50% | 5.00% | 7497 | 959630 |
| 29 | 23.50% | 45.00% | 20.00% | 1.50% | 5.00% | 7682 | 940618 |
| 30 | 27.10% | 50.00% | 21.30% | 1.60% |  | 7542 | 942914 |
| 31 | 23.90% | 60.00% | 15.00% | 1.13 |  | 7630 | 1045484 |
| 32 | 38.50% |  | 20.00% | 1.5 | 40.00% | 2050 | 630818 |

| Twin-Screw Ext. | PP BP 7200 | Wood Flour | Epon1001F | Amine Blkr. | Tensile Str. (PSI) | Tensile Modulus (PSI) | Flexural Str. (PSI) | Flexural Modulus (PSI) |
|---|---|---|---|---|---|---|---|---|
| 33 | 45.00% | 50.00% | 5.00% |  | 2664 | 559934 | 6663 | 695546 |
| 34 | 30.00% | 50.00% | 20.00% |  | 2351 | 557023 | 5504 | 757728 |

The following examples are illustrative of the invention and are not meant to limit the scope of the invention in any way.

Example 1

In this example 20 wt % wood flour having a mesh size of about 100, was combined with 77 wt % of the thermoplastic base material of Example 1C, this was then processed in a single screw extruder with 3 wt % PB 3200. PB 3200 is available from Crompton Corporation, Middlebury, Conn., 06749, USA. The 100 mesh wood flour, obtained from American Wood Fibers, had an aspect ratio of about 4:1 L/d. The second thermoplastic resin PB3200 is a maleic anhydride grafted polypropylene. Tensile strength (psi), modulus of elasticity (psi), flexural strength (psi), and flexural modulus (psi) were measured.

See Tables 1 and 2, where the tested biomaterials are wood fiber, soy flour, hemp fiber, and flax fiber. A non-biomaterial additive is calcium carbonate. BP 7200 is a first thermoplastic, PB 3200 and phenethyltrimethoxysilane are the second thermoplastic selected thermoplastics. The second thermoplastic improved the flexural modulus over the control.

Example 2

In this example 20 wt % wood flour having a mesh size of about 200, was added to 77 wt % of the base material of Example 1C, this was then processed in a single screw extruder with 3 wt % PB 3200. The 200 mesh wood flour, obtained from American Wood Fibers, had an aspect ratio of about 3:1. Tensile strength (psi), modulus of elasticity (psi), flexural strength (psi), and flexural modulus (psi) were measured.

Examples 3-11

Examples 3 through 11, were all processed with the aforementioned single screw extruder, and were typical repeats of Examples 1-2 with various biomaterials such as wood flour, soy flour (aspect ratio of about 2:1 L/d), hemp fibers, flax fibers; calcium carbonate (aspect ratio of about 2:1, about 400 mesh); thermoplastic resin (BP 7200), and second coupling agent (PB 3200, phenethyltrimethoxysilane, (i.e. PETMOS). PETMOS is available from Gelest, Inc., 612 William Leigh Drive, Tullytown, Pa. 19007, USA. Tensile strength (psi), modulus of elasticity (psi), flexural strength (psi), and flexural modulus (psi) were measured. See Table 1.

The PETMOS was added in the following manner. Wood flower (200 mesh) was added to a mixing bowl in the amounts shown in Table 1. A mixture of PETMOS in ethanol was sprayed onto the wood flower while mixing. The PETMOS coated wood flower was poured onto baking dishes. The baking dishes were placed on an oven at 110° C. for a time sufficient to cure.

Examples 12-14

Examples 12 through 14, were all processed with the aforementioned two roll mill and were processed with biomaterials such as various amounts of 200 mesh wood flour; calcium carbonate (aspect ratio of about 2:1); thermoplastic resin (BP 7200); and a coupling agent (PB 3200 or phenethyltrimethoxysilane). Tensile strength (psi), modulus of elasticity (psi), flexural strength (psi), and flexural modulus (psi) were measured. PETMOS was added as in Examples 6, 7, and 10.

Examples 15-18

Examples 15 through 18, were all processed with the aforementioned Berstorff extruder (twin screw extruder), with various biomaterials such as 200 mesh wood flour, hemp fibers (about 25 mm in length), flax fibers (about 25 mm in length); thermoplastic resin (BP 7200) and coupling agent (PB 3200). The hemp fibers are characterized by aspect ratio. The aspect ratio is about 100:1 and the hemp fibers can be obtained from FlaxCraft Inc., 210 Knickerbocker Road, Cresshill, N.J. 07626, USA.

The flax fibers are characterized by aspect ratio. The aspect ratio is about 100:1 and the flax fibers can be obtained from FlaxCraft Inc., 210 Knickerbocker Road, Cresshill, N.J. 07626, USA. Tensile strength (psi), modulus of elasticity (psi), flexural strength (psi), and flexural modulus (psi) were measured.

Examples 19-21

Examples 19 through 21, were all processed with the aforementioned two mill roll with 50 wt % 200 mesh wood flour, 10 wt % calcium carbonate (aspect ratio of about 2:1); and various amounts of thermoplastic resin (BP 7200) and coupling agent (PB 3200). Tensile strength (psi), modulus of elasticity (psi), flexural strength (psi), and flexural modulus (psi) were measured.

For Examples 22 through 34, please refer to Table 2. Table 2 shows three sets of experiments used to evaluate the properties of the resultant materials made according to the invention along with several controls.

Examples 22-25

Examples 22 through 25, were all processed with the aforementioned two roll mill with 50 wt % 200 mesh wood flour, and various amounts of thermoplastic resin (BP 7200) and various amounts of coupling agent (Epon 100F), available from Miller-Stephenson Chemical Co. INC. Danbury, Conn. 06810, USA, and amine blocker (2-adamantanone diethylene tri-amine).

The amine blocker was produced as follows: Toluene, as an azeotropic solvent to remove the water of reaction, was added to a suitably sized round bottom flask fitted with a stir bar, magnetic stir plate, heating mantel, reflux condenser and a Dean-Stark tube. The flask was then charged with m-xylene-diamine, 2-adamantanone (1:1 mole ratio) and a catalytic amount of p-toluene sulfonic acid. The neck of the reaction flask was wiped with a small amount of toluene to remove any trace reactant(s). The flask walls were also rinsed with a small amount of toluene to minimize exposure of reagents to ambient moisture. After addition of the toluene to minimize exposure of reagents to ambient moisture. After addition of the reaction mixture, the flask was purged under a stream of argon for about five minutes while stirring. The reflux condenser was quickly put in place and fitted with a gas inlet tube to provide a very slight positive pressure. Water flow to the condenser was started and the reaction flask and the Dean-Stark tube were wrapped in foil to improve water azeotroping efficiency. Stirring was initiated and heating of the reaction mixture was commenced. The mixture was maintained under steady state conditions while stirring until either 100 percent of the theoretical water of reaction was recovered in the Dean-Stark or water ceased to zoetrope. (Note: water was drained from the Dean-Stark as required to prevent overfilling). Typically, the amount of water recovered, based on theoretical, was 96 to 99 percent. At the end of each run, the reaction flask was culled overnight to room temperature under a slight increase in initial argon pressure or with the drying tube in place. The positive increase in argon pressure was to prevent the transport of trap oil and moisture into the reaction flask. After cooling to room temperature, the reaction mixture was placed on a Rotovap to remove toluene and any un-reacted material. Bath temperature was 70° C. with vacuum increased slowly to ~2 mmHg over one hour. The reaction flask was returned to ambient pressure under argon, removed from the Rotovap, and placed in a vacuum oven over the weekend to remove remaining traces of toluene (70° C., ~2mmHg). Heat to the vacuum oven was turned off and the flask was cooled to ambient temperature while maintaining vacuum. Under a stream of argon, the flask was returned to ambient pressure, placed over mole sieves, capped, sealed with Parafilm and stored at room temperature until formulation experiments were started.

Tensile strength (psi), modulus of elasticity (psi), flexural strength (psi), and flexural modulus (psi) were measured. These examples illustrate that the addition of the thermoset coupling agent increased the flexural modulus significantly.

Examples 26-32

Examples 26 through 32 are all were all processed with the aforementioned two roll mill with between 23.5 wt % to 55 wt % BP 7200. Between 0 wt % and 60 wt % 200 mesh wood flour, and between 0 wt % to 21.30 wt % of coupling agent (Epon 1001F), and 0 wt % to 1.6 wt % amine blocker were used. In addition, between 0 wt % and 45 wt % flax of the type from previous examples were used. Flexural strength and flexural modulus were measured.

Examples 33-34

Examples 33 and 34 were all processed with the aforementioned twin screw extruder using between 30.0 wt % to 45 wt % BP 7200. About 50 wt % 200 mesh wood flour, and between 5 wt % to 20 wt % of coupling agent (Epon 1001F), and 0 wt % to 1.6 wt % amine blocker (2-adamantanone diethylene tri-amine) were used. In addition, between 0 wt % and 45 wt % flax of the type from previous examples were used. Tensile strength (psi), modulus of elasticity (psi), flexural strength (psi), and flexural modulus (psi) were measured.

TABLE 3

| Formulation No. | MATERIAL | MODULUS OF ELASTICITY (PSI) |
|---|---|---|
| 1 | Baseline – PP Only | 196,400 |
| 2 | PolyBond Solution | 526,329 |
| 3 | Epon | 903,694 |
| 4 | Epon + Blocked Amine | 1,045,484 |

For comparison, a typical current wood product composite has a modulus of elasticity of about 538,000 psi.

Referring now to the Table 3, Table 3 lists four formulations that were prepared for evaluation. The first formulation was that obtained for BP 7200 at substantially 100 wt % (Example 1C from Table 1).

The second formulation contained BP 7200, 200 mesh wood flour and Polybond 3200. About 37 wt % of BP 7200, 60 wt % 200 mesh wood flour, and 3% Polybond 3200 were used (Example 13 from Table 1).

The third formulation contained BP 7200, 200 mesh wood flour and Epon 1001F. About 29 wt % of BP 7200, 50 wt % of 200 mesh wood flour, and 21 wt % Epon 1001F were used (Example 22 from Table 2).

The fourth formulation contained BP 7200, 200 mesh wood flour, Epon 1001F, and 2-adamantanone diethylene tri-amine crosslinker. About 23.9 wt % of BP 7200, 60 wt % 200 mesh wood flour, 15 wt % Epon 1001F, and 1.13 wt % of 2-adamantanone diethylene tri-amine were used (Example 31 from Table 2). The latter formulation gave the best results for all of the examples.

Current wood plastic composites typically have a flexural modulus of up to about 538,00 psi. In the present invention, addition of Epon 1001F, or Epon 1001F and crosslinker greatly increased the baseline flexural modulus. See for Table 2: Epon 1001F alone in Examples 22, 33, and 34. In Examples 23-25, and 28-31, Epon 1001F and crosslinker resulted in even higher flexural moduli.

Examples A1-A17

Additional samples were prepared as listed in Table 4. In the samples below XDA stands for xylylenediamine, DETA stands for diethylenetriamine and HB 9600™ is a polypropylene manufactured by BP AMOCO Polymers. Comp 1 and Comp 2 are comparison samples of wood replacement composites presently on the market and obtained in two different hardware stores. The extrusion of 5/4 board represents a scale up where 1500 lbs per hour were produced for one hour.

TABLE 4

| Sample | Process | PP Type[1] (%) | Wood Flour (%) | Epon 1001 (%) | Blocked Amine Type[2] (%) | Flexural Modulus (PSI) | Standard Dev. | Tg (° C.) |
|---|---|---|---|---|---|---|---|---|
| A1 | Baker-Perkins/Pressed | HB/27.1% | 50.0% | 21.3% | XDA/1.60%* | 561760 | 86088 | 58 |
| A2 | Baker-Perkins/Pressed | HB/26.0% | 50.0% | 20.0% | XDA/4.00%* | 548627 | 26171 | 93 |
| A3 | Baker-Perkins/Pressed | HB/26.0% | 50.0% | 18.0% | XDA/6.00%* | 454150 | 18624 | 100 |
| A4 | Baker-Perkins/Pressed | HB/31.0% | 50.0% | 15.0% | XDA/4.00%* | 551817 | 40351 | 92 |
| A5 | Baker-Perkins/Pressed | HB/27.1% | 50.0% | 21.3% | DETA/1.60% | 576716 | 29362 | 64 |
| A6 | Baker-Perkins/Pressed | HB/26.0% | 50.0% | 20.0% | DETA/4.00% | 563033 | 61030 | 99 |
| A7 | Baker-Perkins/Pressed | HB/26.0% | 50.0% | 18.0% | DETA/6.00% | 619900 | 14835 | 97 |
| A8 | Extruded 5/4 Board | HB/35.0% | 50.0% | 15.0% | DETA/0.00% | 494222 | 13213 | 45 |
| A9 | Extruded 5/4 Board | HB/32.8% | 50.0% | 15.0% | DETA/2.20% | 553212 | 12856 | 60 |
| A10 | 2 Roll Mill | BP/23.9%* | 60.0% | 15.0% | DETA/1.13% | 1045484 | — | 70 |
| A11 | 2 Roll Mill | BP/29.0%* | 50.0% | 21.0% | DETA/0.00% | 903694 | — | 50 |
| A12 | 2 Roll Mill | BP/27.1%* | 50.0% | 21.3% | DETA/1.60% | 955867 | — | 70 |
| A13 | 2 Roll Mill | BP/27.1%* | 50.0% | 21.3% | DETA/1.60% | 971955 | — | 70 |
| A14 | 2 Roll Mill | BP/26.0%* | 50.0% | 20.0% | DETA/4.00% | 935303 | — | 90 |
| A15 | 2 Roll Mill | BP/27.1%* | 50.0% | 21.3% | DETA/1.60% | 942914 | — | 71 |
| A16 | Twin Screw Extruded | BP/45.0%* | 50.0% | 5.00% | DETA/0.00% | 695546 | — | 52 |
| A17 | Twin Screw Extruded | BP/30.0%* | 50.0% | 20.0% | DETA/0.00% | 757728 | — | — |

[1]BP in the PP column (polypropylene resin) corresponds to BP7200 resin
HB in the PP column (polypropylene resin) corresponds to HB9600 resin
[2]XDA or DETA
DETA is an example of a blocked ketamine
In samples A1 to A9 the Baker-Perkins machine has a twin screw section and a single screw section the product is pressed when extruded.

TABLE 5

Sample measurements after being at 50° C. for 24 hours

| Sample* | Dry Weight* (g) | Dry Thickness (in) 1 | 2 | 3 | Avg. | Dry Width (in) 1 | 2 | 3 | Avg | Dry Length (in) 1 | 2 | 3 | Avg |
|---|---|---|---|---|---|---|---|---|---|---|---|---|---|
| A1 | 13.4026 | 0.2262 | 0.2276 | 0.2234 | 0.2257 | 1.036 | 1.039 | 1.039 | 1.038 | 2.980 | 2.982 | 2.978 | 2.980 |
| A2 | 11.6849 | 0.2153 | 0.2098 | 0.2071 | 0.2107 | 1.006 | 1.007 | 1.006 | 1.006 | 2.878 | 2.888 | 2.892 | 2.886 |
| A3 | 11.6991 | 0.2069 | 0.2115 | 0.2131 | 0.2105 | 0.995 | 0.994 | 0.998 | 0.996 | 2.965 | 2.964 | 2.962 | 2.963 |
| A4 | 11.3322 | 0.2058 | 0.2104 | 0.2123 | 0.2095 | 0.995 | 0.995 | 0.995 | 0.995 | 2.936 | 2.929 | 2.921 | 2.929 |
| A5 | 10.8547 | 0.1872 | 0.1927 | 0.1949 | 0.1916 | 1.019 | 1.012 | 1.010 | 1.014 | 2.963 | 2.962 | 2.957 | 2.961 |
| A6 | 11.5088 | 0.2125 | 0.2077 | 0.2046 | 0.2082 | 1.004 | 1.007 | 1.011 | 1.007 | 2.887 | 2.890 | 2.889 | 2.889 |
| A7 | 10.9550 | 0.2109 | 0.2039 | 0.2014 | 0.2054 | 0.992 | 0.989 | 0.986 | 0.989 | 2.851 | 2.852 | 2.849 | 2.850 |
| Comp 1 | 15.2056 | 0.2675 | 0.2691 | 0.2654 | 0.2673 | 0.984 | 0.981 | 0.974 | 0.979 | 2.960 | 2.958 | 2.956 | 2.958 |
| Comp 2 | 14.0512 | 0.2697 | 0.2693 | 0.2685 | 0.2692 | 1.171 | 1.179 | 1.183 | 1.178 | 2.918 | 2.911 | 2.904 | 2.911 |

*Same sample as in Table 4

TABLE 6

Sample measurements after being immersed in distilled water at 37° C. for 24 hours

| Sample* | Wet Weight* (g) | Wet Thickness (in) 1 | 2 | 3 | Avg. | Wet Width (in) 1 | 2 | 3 | Avg | Wet Length (in) 1 | 2 | 3 | Avg |
|---|---|---|---|---|---|---|---|---|---|---|---|---|---|
| A1 | 13.5405 | 0.2281 | 0.2290 | 0.2250 | 0.2274 | 1.037 | 1.038 | 1.039 | 1.038 | 2.980 | 2.983 | 2.978 | 2.980 |
| A2 | 11.8127 | 0.2168 | 0.2116 | 0.2091 | 0.2125 | 1.007 | 1.009 | 1.010 | 1.008 | 2.881 | 2.889 | 2.894 | 2.888 |
| A3 | 11.8166 | 0.2089 | 0.2122 | 0.2141 | 0.2117 | 1.003 | 0.995 | 0.993 | 0.997 | 2.967 | 2.966 | 2.963 | 2.965 |
| A4 | 11.4274 | 0.2072 | 0.2113 | 0.2136 | 0.2107 | 0.997 | 0.995 | 0.996 | 0.996 | 2.937 | 2.931 | 2.924 | 2.931 |
| A5 | 10.9757 | 0.1884 | 0.1944 | 0.1966 | 0.1931 | 1.020 | 1.014 | 1.009 | 1.014 | 2.966 | 2.964 | 2.959 | 2.963 |
| A6 | 11.6222 | 0.2136 | 0.2091 | 0.2064 | 0.2097 | 1.008 | 1.008 | 1.011 | 1.009 | 2.886 | 2.888 | 2.889 | 2.888 |
| A7 | 11.0649 | 0.2125 | 0.2063 | 0.2030 | 0.2072 | 0.993 | 0.993 | 0.985 | 0.990 | 2.851 | 2.852 | 2.850 | 2.851 |
| Comp 1 | 15.5992 | 0.2708 | 0.2712 | 0.2671 | 0.2697 | 0.997 | 0.995 | 0.985 | 0.992 | 2.971 | 2.970 | 2.969 | 2.970 |
| Comp 2 | 15.5390 | 0.2728 | 0.2820 | 0.2714 | 0.2754 | 1.210 | 1.220 | 1.223 | 1.218 | 2.950 | 2.947 | 2.937 | 2.944 |

*Same sample as in Table 4

TABLE 7

Weight change after 24 hours immersed in distilled water at 23° C. ASTM D570-98

| Sample* | Weight Change (%) | Thickness Change (%) | Width Change (%) | Length Change (%) |
|---|---|---|---|---|
| A1 | 1.03% | 0.73% | −0.02% | 0.01% |
| A2 | 1.09% | 0.83% | 0.20% | 0.07% |
| A3 | 1.00% | 0.57% | 0.13% | 0.06% |
| A4 | 0.84% | 0.59% | 0.12% | 0.07% |
| A5 | 1.11% | 0.77% | 0.03% | 0.06% |
| A6 | 0.99% | 0.69% | 0.18% | −0.03% |
| A7 | 1.00% | 0.91% | 0.13% | 0.01% |
| Comp 1 | 2.59% | 0.89% | 1.33% | 0.41% |
| Comp 2 | 10.59% | 2.30% | 3.38% | 1.16% |

*Same sample as in Table 4

The wet immersion test results detailed in Tables 5, 6, and 7 clearly show that biocomposite samples prepared using the inventive elements of the subject patent application have significantly improved water resistance and dimensional stability after exposure to water at various temperatures. For instance, it is seen in Table 7 that thickness change for the experimental biocomposite samples (A1 through A7) after water exposure are significantly less than 0.2% compared to control samples that have thickness change of 1.33% and 3.38%. The data clearly shows that biocomposites prepared using the composition and process described in the application have not only superior mechanical properties but significantly enhanced water resistance properties compared to state of the art composites.

Glass Transition Temperature vs. Flexural Modulus Tests

Figure 2:
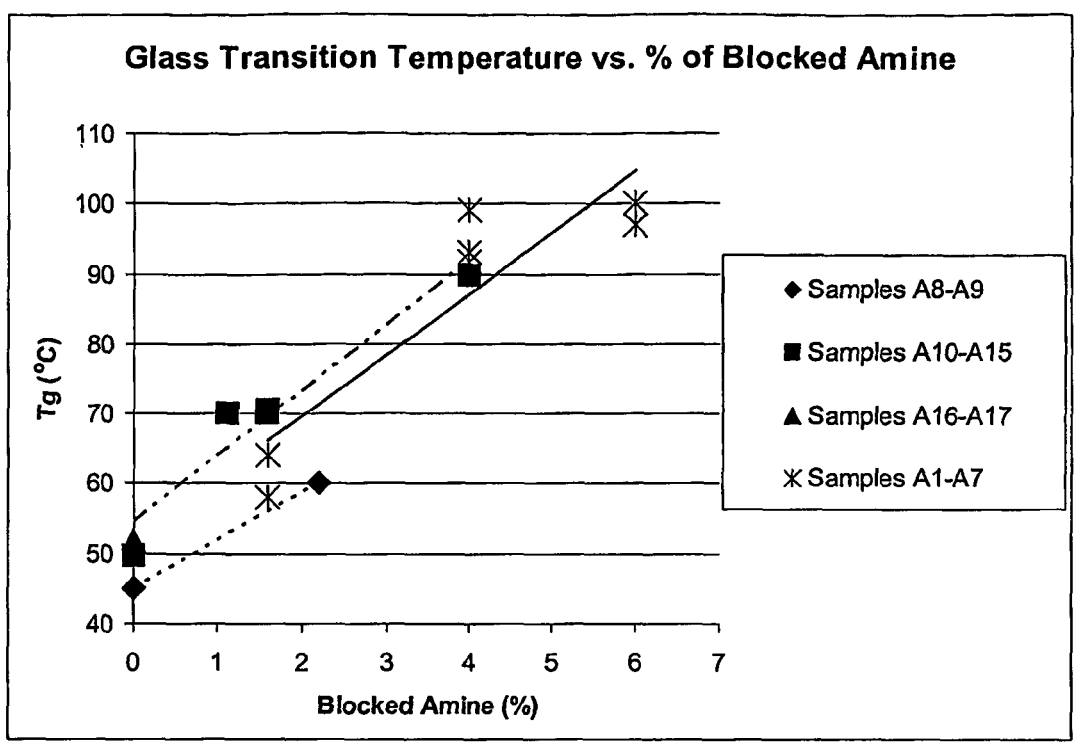
FIG. 2 is a graph showing glass transition temperature as a function of the amount of blocked amine. Glass transition temperature is on the vertical scale, $T_g$ in ° C. The amount of blocked amine on the horizontal scale is in percent (%).
Figure 3:
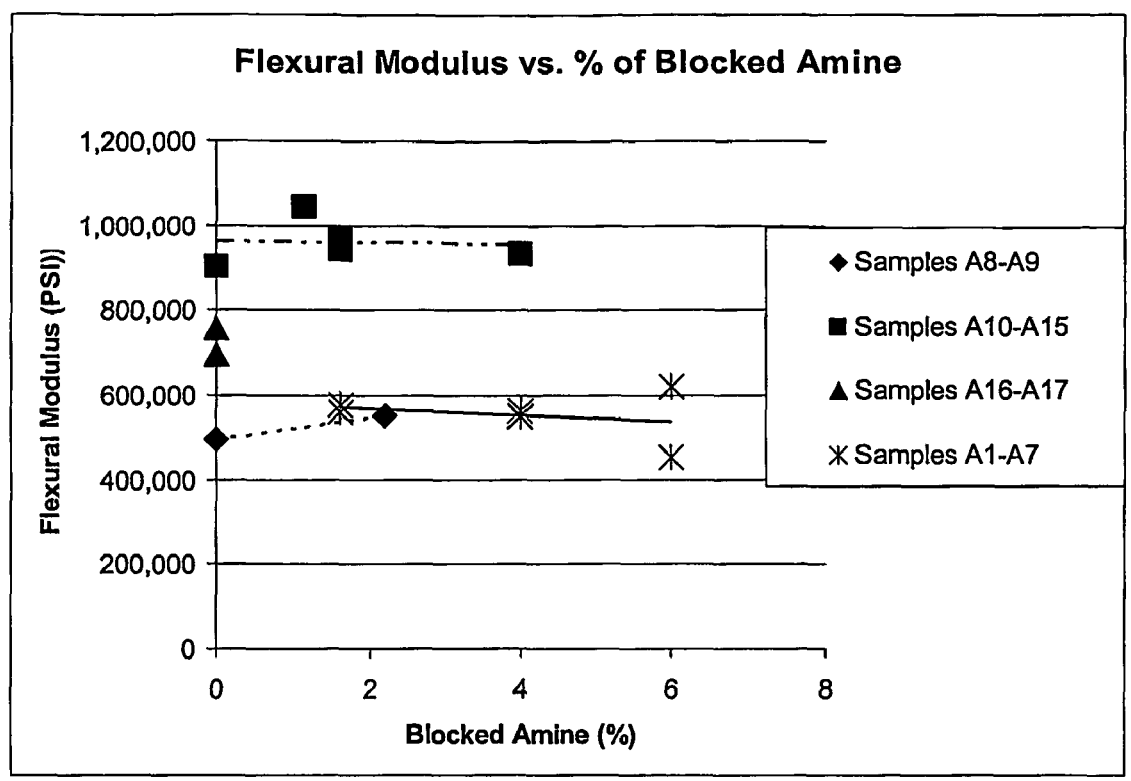
FIG. 3 is a graph showing flexural modulus as a function of the amount of blocked amine. Flexural modulus is on the vertical scale in pounds per square inch (PSI). The amount of blocked amine on the horizontal scale is in percent (%).

Referring now to FIGS. 1-3, these examples show the correlation between the glass transition temperature and the flexural modulus for the bio-composite samples. Ten different bio-composite samples were examined via DSC and 3-point bend tests and then by graphing the Tg versus flexural modulus.

There is a weak trend showing that an increase in flexural modulus leads to an increase in the Tg, but there are two other major factors to consider. They are the process by which the sample was made and the amount of blocked amine present in each sample. As seen in FIG. 1, it appears that the extruded samples of 5/4 board have the lowest flexural modulus and the samples formed via 2 Roll Mill have the highest flexural modulus regardless of the amount of blocked amine in them. This is probably due to the length of the residence time during the forming process. The extruded samples of 5/4 board had a very short residence time (seconds) while the samples formed on the 2 Roll Mill had a residence time on the order of tens of minutes.

To further evaluate how the amount of blocked amine affected both the Tg and the flexural modulus of each sample, data was plotted for each (FIGS. 2 and 3). FIG. 2 shows Tg versus percentage of blocked amine. A strong trend shows that an increase in the percentage of blocked amine leads to an increase in Tg and that the 2 Roll Mill samples may always yield a higher Tg than the extruded samples of 5/4 board. The plot of flexural modulus versus percentage of blocked amine (FIG. 3) also shows the same trends on a weaker level because the flexural modulus stays nearly constant regardless of the percentage of blocked amine added, but again the type of process used to make the samples are clearly segregated on the plot.

The results in the graphs appear to show that the Tg is much more sensitive then the flexural modulus when compared to the change in the percentage of blocked amine added. If the Tg is a good indicator of cross-linking density, then it appears that the percentage of blocked amine plays a large role in the amount of cross-linking occurring. So, the percentage of blocked amine must also be a good indicator of cross-linking density, and then this data shows that Tg is more sensitive to cross-linking density than the flexural modulus. In order to increase the flexural modulus greatly, a much larger amount of blocked amine must be added, which will also increase the Tg appreciably.

The bio-composite synthetic wood that was extruded on the Baker-Perkins and then pressed out was tested for water absorption and dimensional stability via ASTM D-570. Samples of treated 5/4" deck board purchased from retail suppliers noted as Comp1 and Comp 2 were also tested. The formulation for the synthetic wood according to the invention can be seen in Table 8.

TABLE 8

Synthetic Wood Formulations
Baker Perkins Extruder Trials

| Trial # | PP BP 9600 (%) | Wood Flour (%) | Epon 1001 (%) | XDA + 2-Adamatanone Blocked Amine (%) |
|---|---|---|---|---|
| 1 | 27.1% | 50.0% | 21.3% | 1.6% |
| 2 | 26.0% | 50.0% | 20.0% | 4.0% |
| 3 | 26.0% | 50.0% | 18.0% | 6.0% |
| 4 | 31.0% | 50.0% | 15.0% | 4.0% |

| Trial # | PP BP 9600 (%) | Wood Flour (%) | Epon 1001 (%) | DETA + 2-Adamatanone Blocked Amine (%) |
|---|---|---|---|---|
| 5 | 27.1% | 50.0% | 21.3% | 1.6% |
| 6 | 26.0% | 50.0% | 20.0% | 4.0% |
| 7 | 26.0% | 50.0% | 18.0% | 6.0% |

All of the samples were tested were 1"×3" and between 0.2 and 0.3" thick. They were conditioned at 50° C. for 24 hours. Immediately following the conditioning each sample was weighed and measured in three different places for thickness. These values can be seen in Table 9.

TABLE 9

Weight and Thickness of Samples after Conditioning

| Sample | Dry Weight (g) | Thickness 1 (in) | 2 (in) | 3 (in) | Ave. Thickness (in) |
|---|---|---|---|---|---|
| Trial 1 | 13.6072 | 0.2263 | 0.2271 | 0.2233 | 0.2255 |
| Trial 2 | 12.1393 | 0.2152 | 0.2096 | 0.2071 | 0.2106 |
| Trial 3 | 12.0717 | 0.2064 | 0.2107 | 0.2126 | 0.2099 |
| Trial 4 | 11.8309 | 0.2049 | 0.2097 | 0.2117 | 0.2087 |
| Trial 5 | 11.0974 | 0.1865 | 0.1921 | 0.1941 | 0.1909 |
| Trial 6 | 12.0959 | 0.2139 | 0.2078 | 0.2052 | 0.2089 |
| Trial 7 | 11.5551 | 0.2108 | 0.2044 | 0.2013 | 0.2055 |
| Comp 1 | 8.8722 | 0.2929 | 0.2951 | 0.2933 | 0.2937 |
| Comp 2r | 6.4530 | 0.2908 | 0.2866 | 0.2873 | 0.2882 |

Next, the samples were immersed in distilled water for 24 hours at 23° C. They were then taken out of the water and the surface was wiped with a clean, dry cloth. The samples were then weighed and measured for thickness again. The percentage increase in both weight and thickness are tabulated in Table 10

TABLE 10

Weight and Dimensional Increases

| Sample | % weight inc. | % thickness inc. |
|---|---|---|
| Trial 1 | 0.98% | 0.38% |
| Trial 2 | 1.02% | 0.59% |
| Trial 3 | 0.91% | 0.69% |
| Trial 4 | 0.81% | 0.76% |
| Trial 5 | 1.05% | 0.79% |
| Trial 6 | 1.07% | 0.10% |
| Trial 7 | 0.90% | 0.46% |
| Comp 1 | 63.16% | 1.39% |
| Comp 2r | 75.04% | 2.06% |

The synthetic wood samples did not look physically different after the immersion, but the purchased wood products appeared darker in color. As shown in Table 3, the percentage increase in weight for the synthetic wood samples ranged from 0.81-1.07%, while the purchased wood products increased in weight by 63 to 75%, a substantially greater amount. The increase in the thickness of the sample also showed the same trend. The synthetic wood samples ranged from 0.10-0.79% increase in thickness, while the purchased wood samples ranged from 1.39-2.06%.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A structural composite formed by the process comprising:
    1) providing a mixture of:
        a. a biomaterial having polar functionality, wherein the biomaterial has residual or added moisture that may unblock a blocked catalyst under thermoprocessing conditions;
        b. a polyolefin mixed with said biomaterial;
        c. a an epoxy resin in an amount of between about 15% and about 21%, that binds the biomaterial with the polyolefin; and
        d. a blocked catalyst, wherein the blocked catalyst unblocks under thermoprocessing conditions;
    2) exposing the mixture to thermoprocessing conditions; wherein the structural composite has a tensile modulus of not less than 656,931 PSI, and a flexural modulus of not less than 935,303 PSI.

2. The structural composite according to claim 1, wherein said composite comprises Bisphenol A.

3. The structural composite according to claim 1, wherein said composite comprises a phenolic.

4. The structural composite according to claim 1, wherein said composite comprises an unsaturated polyester.

5. The structural composite according to claim 1, wherein said blocked catalyst comprises a ketimine.

6. The structural composite according to claim 1, also comprising a crosslinking agent.

7. The structural composite according to claim 1, wherein said biomaterial is selected from the group consisting of plant fibers, animal fibers, granulated plant derivatives, and mixtures thereof.

8. The structural composite according to claim 7, wherein said biomaterial is selected from the group consisting of wood flour, wood flakes, soy flour, wool, hair, feathers, and mixtures thereof.

9. The structural composite according to claim 7, wherein said fiber is selected from the group consisting of flax fibers, straw fibers, hemp fibers, jute fibers, cotton fibers, and mixtures thereof.

10. The structural composite according to claim 1, wherein said polyolefin is selected from the group consisting of polypropylene, polyethylene, polybutylene, polyvinylchloride, and mixtures thereof.

11. The structural composite according to claim 1, further comprising
    e. chopped fiber glass, mixed with said biomaterial, polyolefin and coupling agent.

12. The structural composite according to claim 1, wherein said biomaterial comprises long grain fibers.

13. The structural composite according to claim 1, wherein said coupling agent is a latent cross linker of agrifiber/wood with blocked curing agents that are activated immediately before, during, or after the extrusion process.

14. The structural composite according to claim 1, wherein said coupling agent is an interfacial compatibilizing agent.

15. A structural composite comprising a biomaterial having polar functional groups, a polyolefin, and an epoxy resin in an amount of between about 15% and about 21%; wherein the epoxy resin is bonded to the biomaterial and the first thermoplastic resin and the epoxy resin is a latent crosslinker of agrifber/wood combined with blocked curing agents that are activated immediately before, during, or after the extrusion process; wherein the structural composite has a tensile modulus of not less than 656,931 PSI, and a flexural modulus of not less than 935,303 PSI.

16. The structural composite according to claim 15, wherein said biomaterial is selected from the group consisting of plant fibers, animal fibers, granulated plant derivatives, and mixtures thereof.

17. The structural composite according to claim 15, wherein said composite comprises Bisphenol A.

18. The structural composite according to claim 15, wherein said composite comprises a phenolic.

19. The structural composite according to claim 15, wherein said composite comprises an unsaturated polyester.

20. The structural composite according to claim 15, wherein said polyolefin is selected from the group consisting of polypropylene, polyethylene, polybutylene, polyvinylchloride, and mixtures thereof.

* * * * *

UNITED STATES PATENT AND TRADEMARK OFFICE
CERTIFICATE OF CORRECTION

PATENT NO. : 7,923,490 B2
APPLICATION NO. : 10/569534
DATED : April 12, 2011
INVENTOR(S) : Bhima R. Vijayendran et al.

It is certified that error appears in the above-identified patent and that said Letters Patent is hereby corrected as shown below:

Column 15, line 42, claim 1, text "c. a an epoxy" should read -- c. an epoxy --.

Column 16, line 30, claim 14, text "said coupling agent" should read -- said epoxy resin --.

Signed and Sealed this
Twenty-first Day of June, 2011

David J. Kappos
*Director of the United States Patent and Trademark Office*